US009634448B2

(12) United States Patent
Rossini

(10) Patent No.: US 9,634,448 B2
(45) Date of Patent: Apr. 25, 2017

(54) LIQUID CRYSTAL DISPLAY MATRIX WITH IRREGULAR APERTURE GEOMETRY

(75) Inventor: Umberto Rossini, Coublevie (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 182 days.

(21) Appl. No.: 14/000,338

(22) PCT Filed: Feb. 14, 2012

(86) PCT No.: PCT/EP2012/052449
§ 371 (c)(1),
(2), (4) Date: Aug. 19, 2013

(87) PCT Pub. No.: WO2012/113673
PCT Pub. Date: Aug. 30, 2012

(65) Prior Publication Data
US 2014/0055734 A1 Feb. 27, 2014

(30) Foreign Application Priority Data
Feb. 22, 2011 (FR) ..................................... 11 51416

(51) Int. Cl.
*G02F 1/1343* (2006.01)
*G02F 1/1362* (2006.01)
(Continued)

(52) U.S. Cl.
CPC ........... *H01R 35/04* (2013.01); *G02F 1/1362* (2013.01); *G02F 1/134309* (2013.01);
(Continued)

(58) Field of Classification Search
CPC ............. G02F 1/1368; G02F 1/136286; G02F 1/134336; G02F 1/134309; G02F 1/1362;
(Continued)

(56) References Cited

U.S. PATENT DOCUMENTS 6,833,882 B2 * 12/2004 Lee ................... G02F 1/136259
349/139
7,655,949 B2 * 2/2010 Yang ..................... H01L 27/283
257/59
(Continued)

FOREIGN PATENT DOCUMENTS

JP 2006-276587 A 10/2006
JP 2006-330472 A 12/2006
(Continued)

OTHER PUBLICATIONS

Definition of term "periodic," Oxford Dictionaries (on-line). Definition downloaded from www.oxforddictionaries.com on Nov. 27, 2015.*
(Continued)

*Primary Examiner* — Angela Davison
(74) *Attorney, Agent, or Firm* — Baker & Hostetler LLP

(57) ABSTRACT

In the field of active matrix liquid crystal displays and, more particularly, to microdisplays produced using collective fabrication technologies, a matrix comprises, for each pixel, a transparent electrode and opaque regions resulting from the presence in the pixel of at least one row conductor, one column conductor, and one control transistor for the pixel connected to the electrode of the pixel. The pixel comprises at least three possible geometrical configurations, the position of the transistor with respect to the rows and to the columns being different in the various configurations, the various configurations being distributed in a pseudo-random manner within at least one region of the matrix.

7 Claims, 3 Drawing Sheets

(51) Int. Cl.
  *G02F 1/1368*  (2006.01)
  *G09G 3/36*  (2006.01)
  *H01R 35/04*  (2006.01)

(52) U.S. Cl.
  CPC ..... *G02F 1/136286* (2013.01); *G09G 3/3648*
    (2013.01); *G09G 2300/0426* (2013.01); *G09G*
    *2300/0465* (2013.01)

(58) Field of Classification Search
  CPC ... G09G 2300/0439; G09G 2300/0426; G09G
    2300/08; G09G 3/3648; G09G 3/3611;
    G09G 3/3666; G09G 2300/0465
  USPC ........ 349/146, 139, 143, 42, 43; 345/51, 55,
    345/92, 103, 694
  See application file for complete search history.

(56) References Cited

U.S. PATENT DOCUMENTS

2004/0239861 A1    12/2004   Uchida
2004/0246404 A1*   12/2004   Elliott .................. G02F 1/1368
                                                              349/88
2009/0262274 A1    10/2009   Noda et al.

FOREIGN PATENT DOCUMENTS

JP     2009-223098 A   10/2009
WO        0020920 A1    4/2000

OTHER PUBLICATIONS

Refusing Reason Notice in Japanese Patent Application No. 2013-553899, dated Jun. 30, 2015.

\* cited by examiner

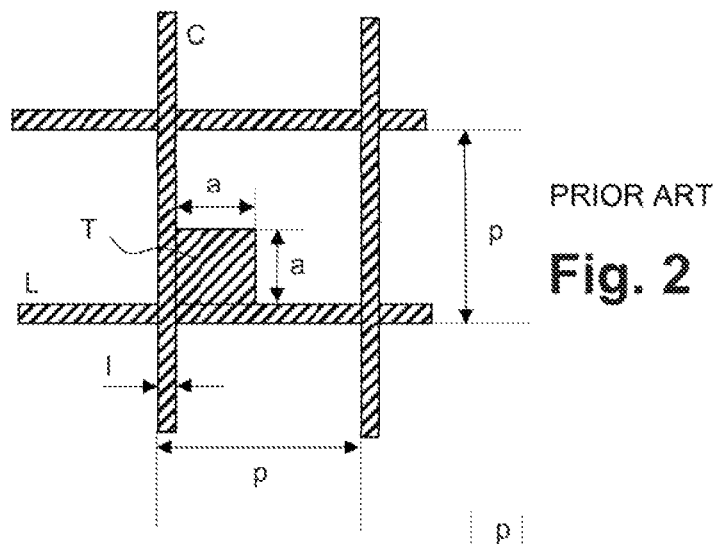
PRIOR ART
Fig. 2
PRIOR ART
Fig. 3
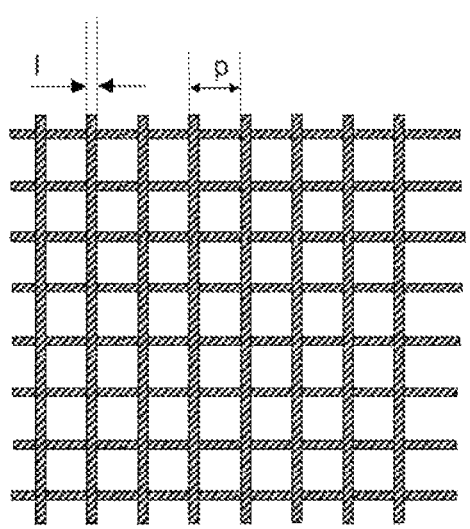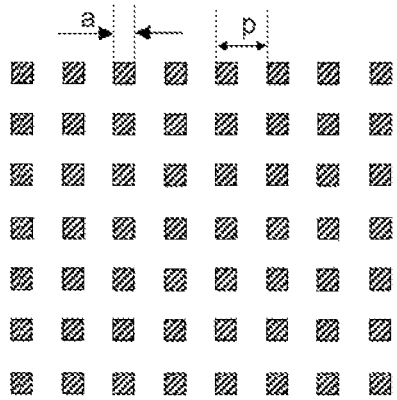
PRIOR ART
Fig. 4 ately opaque, the transistor must be protected from the light by an opaque layer, without which its operation could be affected by the light source illuminating the matrix.

LIQUID CRYSTAL DISPLAY MATRIX WITH IRREGULAR APERTURE GEOMETRY

CROSS-REFERENCE TO RELATED APPLICATIONS

This application is a National Stage of International patent application PCT/EP2012/052449, filed on Feb. 14, 2012, which claims priority to foreign French patent application No. FR 1151416, filed on Feb. 22, 2011, the disclosures of which are incorporated by reference in their entirety.

FIELD OF THE INVENTION

The invention relates to active matrix liquid crystal displays and, more particularly, to microdisplays produced using collective fabrication technologies (a technology notably referred to as LCOS, for "Liquid Crystal On Silicon") inspired by microelectronics technologies. In these displays, a control transistor is associated with each pixel of the matrix and this transistor is integrated onto the same substrate which comprises the control electrodes of the liquid crystal.

BACKGROUND

An active matrix display conventionally comprises a matrix of rows and columns of pixels, each pixel comprising a liquid crystal between an individual pixel electrode separated from the electrodes of the other pixels and a counter-electrode common to all the pixels. The voltage applied between the pixel electrode and the common electrode produces an electric field which orients the molecules of the liquid crystal as according to the modulus of the field. This orientation acts on the polarization of the light which passes through the crystal in such a manner as to define, in combination with the use of polarizers, a level of transmission of light which depends on the applied electric field. A control transistor (the active element of the pixel) connects the pixel electrode of all the pixels of the same column to a respective column conductor. The column conductor receives, at a given moment, an analog voltage defining a grey level to be applied to the pixel; if the transistor is conducting, this voltage is applied to the pixel electrode; otherwise, the pixel behaves as an isolated capacitor and conserves the voltage level previously received. The control transistors of the same row of pixels are controlled via a respective row conductor; thus, during the writing of an image frame, the various rows of the matrix are successively addressed for writing, at a given moment, into the pixels of the row addressed the information applied at this moment by the column conductors.

FIG. 1 shows the general structure of such a matrix, where CL denotes a liquid crystal cell and Q denotes the transistor associated with this cell, the whole assembly of the cell and the transistor forming the pixel. The common counter-electrode of the cell is denoted by CE, the individual electrode of the pixel, not electrically connected to the individual electrodes of the other pixels, is denoted by Ep. The row control conductors are denoted by $L_1$ to $L_n$ for a matrix with n rows. The column conductors are $C_1$ to $C_m$ for a matrix with m columns. A row decoder DEC successively addresses the various rows. When a row is addressed, a digital-analog conversion circuit DAC applies a set of analog voltages to the column conductors representing the image to be displayed by this row. The conversion circuit establishes these analog voltages based on a digital signal. A sequencing circuit SEQ ensures the synchronized operation of the row decoder and of the conversion circuit DAC.

The micro-display can operate in reflection mode (which is the most common in LCOS technologies) or in transmission mode.

In the fabrication of very small active matrix displays, the dimensions of the pixels can go as low as a few micrometers on a side. For example, the pitch of the pixels is 5 micrometers, which is very small. Within the surface area reserved for a pixel, room must be provided for the addressing row, for the signal column, and for the control transistor. These elements occupy a surface area which is not usable for the transmission of light through the liquid crystal since they are opaque, for example if the conductors are made of copper or aluminum. Moreover, even if it is not naturally opaque, the transistor must be protected from the light by an opaque layer, without which its operation could be affected by the light source illuminating the matrix.

As a consequence, the transmission of light through the pixel only takes place over a limited part of the overall surface area allocated to the pixel. By way of example, if the pitch is 5 micrometers in a row and in a column, the surface area reserved for a pixel is 25 square micrometers; the rows and columns can each occupy around 1 to 2 square micrometers over the length of the pixel, and the transistor around 5 square micrometers. The opaque surface then occupies between 7 and 9 square micrometers in this example. Generally speaking, the aperture of the pixel, in other words the ratio between the surface area which allows the light to pass and the total surface area of the pixel, is in the range between around 65% and 70%.

FIG. 2 shows symbolically the opaque and transparent regions of a pixel of such a matrix. The opaque row and column conductors are situated on the edges of the pixel and frame a region comprising, on the one hand, a transparent portion covered by an individual transparent electrode and, on the other hand, a transistor, also opaque, connected to the pixel electrode. For simplicity, the row L and column C conductors are considered as rigorously rectilinear, of constant width I; the transistor T is considered as being a square with a side a, but it could have another shape; the pitch of the pixel is considered as being equal to a value p both along a row and along a column. The transistor is placed in the bottom left corner in the hypothesis where its gate is connected to the row conductor situated just underneath the transistor and its drain is connected to the column conductor situated just to its left. The transparent electrode used to control the liquid crystal of the pixel is not shown. It occupies at least the surface area of the aperture left free between the row, column, and transistor opaque regions, but it can occupy almost the whole surface of the pixel.

With a simple geometric configuration such as that in FIG. 2, it has been observed that the very small size of the pixels, and hence of the patterns existing in the pixel would lead to optical defects mainly due to the fact that the size of the patterns is not very far from the wavelengths of the light which passes through the matrix. The diffraction of the light which results from this is an issue. When the display is used for observing or projecting images, this issue affects the quality of the images. When the display is used for correcting wavefronts in high quality optics, this issue has an even bigger effect since the level of interference due to the diffraction can be greater than the correction to be applied.

SUMMARY OF THE INVENTION

The aim of the invention is to reduce as much as possible the optical defects observed due to the diffraction of light by the opaque patterns.

According to the invention, an active matrix liquid crystal is provided comprising a regular array of rows and columns of pixels, each pixel being bounded by two adjacent row conductors and two adjacent column conductors, with for each pixel a transparent region covered by an individual transparent electrode and opaque regions resulting from the presence in the pixel of the row conductors, of the column conductors, and of a control transistor for the pixel connected to the electrode of the pixel, this matrix being characterized in that the pixel comprises at least three possible geometrical configurations, the position of the transistor with respect to the row and column conductors which bound the pixel being different in the various configurations, the various configurations being distributed in a pseudo-random manner within at least one region of the matrix.

Pseudo-random is understood to mainly refer to the fact that the distribution of the various configurations is not periodic inside of the region. The region preferably comprises at least one hundred adjacent pixels. More particularly, according to the invention, the configurations are pseudo-random for a series of at least ten adjacent pixels in the same row or in the same column, in other words there is no periodicity of the configurations either in a row or in a column.

The pseudo-random distribution of several geometrical configurations of the aperture of the pixel, due to a variable position of the control transistor, very substantially reduces the diffraction peaks that are observed when the configuration is the same for all the pixels.

It is preferable for the whole matrix to be organized with a pseudo-random distribution, hence a total absence of periodicity in the matrix, whether this be in rows or in columns. However, for reasons associated with the ease of design of the lithography masks, it may be provided for the pseudo-random distribution to be limited to portions of the matrix, these portions being repeated in an identical fashion; this is possible as long as the repetition pitch of these regions is much bigger than the pitch of the pixels (at least 10 times) and of course much bigger (at least a hundred times) than the wavelengths of the light; indeed, the diffraction due to the periodicity of wide patterns (hence with dimensions much greater than the wavelength) is much less critical than the diffraction due to a short periodicity.

In a preferred embodiment, the pixels have five possible configurations.

The configurations can, in this case, be as follows: transistor at the lower left, transistor in the lower middle, transistor at the lower right, transistor in the center left, transistor at the upper left. The columns are assumed to be oriented vertically and the rows horizontally.

In practice, it will be the case that, in at least one of the geometrical positions, the transistor is adjacent to a row conductor (or respectively a column conductor) but is not adjacent to a column conductor (or respectively a row conductor) to which it is to be connected. In this case, the connection risks reducing the aperture of the pixel. In order to avoid this, it is provided for the connection between the transistor and this column conductor (or respectively row conductor) to be provided by a conductor which is superposed on the row conductor (or respectively column conductor). It is therefore superposed on an already opaque region and does not reduce the aperture.

The connection conductor which is thus superposed on the row conductor (or respectively column conductor) can simply be an extension of the column conductor (or respectively row conductor), running on top of the row conductor (or respectively column conductor).

BRIEF DESCRIPTION OF THE DRAWINGS

Other features and advantages of the invention will become apparent upon reading the detailed description that follows and which is presented with reference to the appended drawings in which:

FIG. 2 shows, in a simplified form, the geometrical configuration of a pixel of the matrix with transparent regions and opaque regions;

FIG. 3 shows the general appearance of a matrix of pixels from the prior art;

FIG. 4 shows a virtual decomposition of the geometrical patterns of the matrix in FIG. 3;

DETAILED DESCRIPTION

Figure 1:
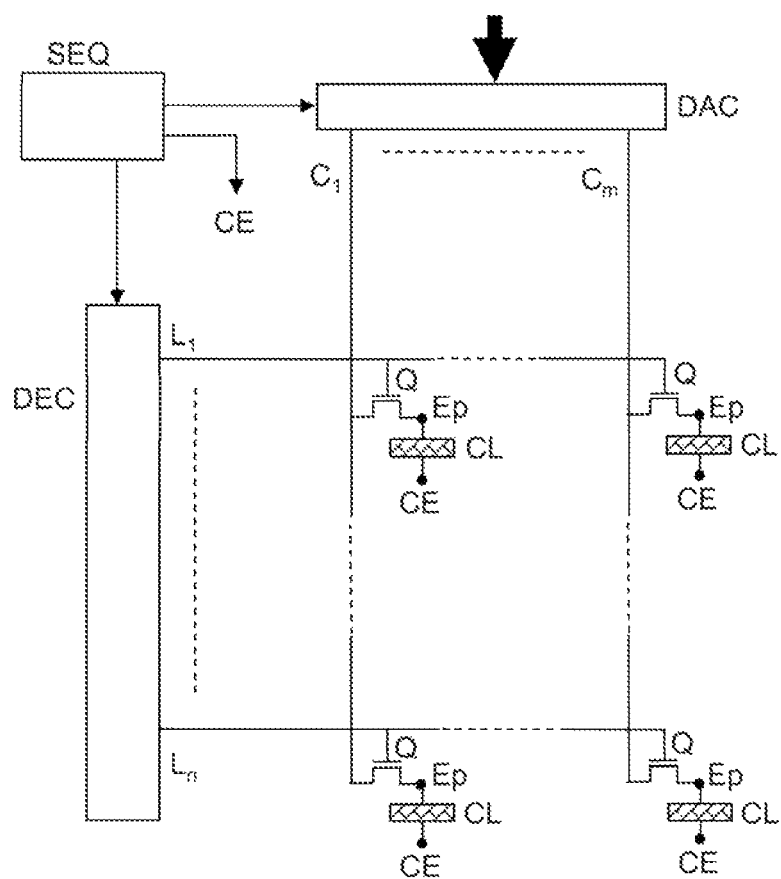
FIG. 1 shows the schematic circuit diagram of an active matrix liquid crystal.

FIG. 3 shows the general appearance of the active matrix using the pixel of the prior art in FIG. 2.

It can be seen that the geometric pattern is regularly repeated with a pitch p (a few micrometers) both along rows and down columns (the pitch could be different).

From the small size of the elements of the pattern there results a non-negligible diffraction of the light passing through the matrix. This diffraction mainly occurs in the case of a matrix operating in transmission mode.

The regularity of the matrix leads to a diffraction which is not uniform and which comprises diffraction peaks along well-characterized directions with respect to the normal. These directions are linked to the ratio between the pitch of the array of pixels and the wavelength.

In one exemplary matrix with a pitch of 5 micrometers with rows and columns of width 0.2 micrometers and transistors with a side of 2.3 micrometers, diffraction peaks have been observed by simulation at angles which are multiples of around 5.7° for a certain wavelength, the peak of the first order (centered on 5.7° from the normal) being much bigger than the peaks of higher order.

In fact, the calculation of the diffraction function allows it to be shown that the diffraction peaks result from the superposition of diffractions solely due to the array of rows and columns and of the diffraction solely due to the array of transistors. The geometric pattern in FIG. 3 may indeed be fictitiously decomposed into two patterns which are shown in FIG. 4: a pattern which only comprises rows and columns of width l framing apertures of width p-l repeated with the pitch p; and a pattern which only comprises opaque squares with side a repeated with the pitch p.

The transmission function $Tlc(x,y)$ of the pixel may be directly calculated, at least approximately, in a regular array of square apertures with side (p-l) repeated with a pitch p, x and y being the coordinates of points in the plane of the matrix. The rows and columns indeed form such an array.

The transmission function of a pixel Tap(x,y) may also be calculated in the case of a fictitious array of square apertures with side a repeated with the pitch p. The array of opaque transistors is not an array of square apertures with side a since the squares with side a are indeed opaque, but the transmission function Ttr(x,y) of the array of opaque transistors taken alone (without the opaque rows and columns) is the complement to 1 of the transmission function of a square aperture with side a.

$$Ttr(x,y)=[1-Tap(x,y)]$$

A matrix of $N^2$ pixels illuminated by a monochromatic source with a wavelength l will generate a diffraction image which, in the Fraunhofer approximation, will be the convolution of the Fourier transforms of the functions Tlc(x,y) resulting from the presence of the opaque rows and columns and Ttr(x,y) resulting from the array of opaque transistors.

$F\{Tpix(x,y)\}=F\{Tlc(x,y)\}*conv*F\{Ttr(x,y)\}$ where F denotes the Fourier transform function, Tpix(x,y) denotes the transmission function of the pixels in FIG. 2, and *conv* the function "convolution product".

Without going into the detail of the calculation, it can be shown that the contribution to the diffraction of the array of $N^2$ pixels is very largely due to the array of opaque transistors (function Ttr(x,y)) as far as the diffraction peak of the first order is concerned, and to a lesser extent the diffraction peak of the third order. The diffracted intensity at the diffraction peak is the same for an array of opaque squares and an array of transparent apertures with the same dimension a and pitch p, only the non-diffracted intensity obviously not being the same.

The calculation with the dimensions chosen for the simulation shows that the peak of the first order comprises a component due to the array of transistors which is around 20 times higher than the component due to the array of rows and columns.

The width of the peaks varies as 1/N; their height varies as $N^4$. The integral of the energy varies as $N^2$.

This diffraction cannot be prevented whenever the dimensions of the opaque regions are close to the wavelength. According to the invention, the diffracted energy is distributed over a large angular region in order to avoid peaks localized at certain angles.

For this purpose, it is chosen to make the array of opaque transistors irregular since it is this array that provides the greatest contribution.

Optionally, irregular shapes may furthermore be given to the rows and columns in order to reduce their contribution to the diffraction, but with negative consequences on the conductivity of the rows (or on the aperture of the pixels if the width of the rows and columns is increased so as to compensate for the loss of conductivity). Furthermore, by giving irregular shapes to the rows and to the columns, the surface area of the pixels can become variable from one pixel to another, which results in a variable electrical charge and hence an uncontrolled electric field.

In order to make the array of transistors irregular, according to the invention, it is provided for the transistor to be able to occupy several possible positions within the surface area of the pixel and for the various positions to be distributed in a pseudo-random manner, in other words essentially non-periodic, when moving along a row or a column.

A certain periodicity can exist on a large scale, in other words a periodicity much greater than the wavelength, preferably at least fifty or one hundred times greater than the wavelength. However, on the scale of at least ten or twenty adjacent pixels or more, in a row or in a column, the distribution of the various configurations of pixels does not comprise any periodicity.

Within the matrix, at least three different configurations of pixels are provided, and preferably at least five.

Figure 5:
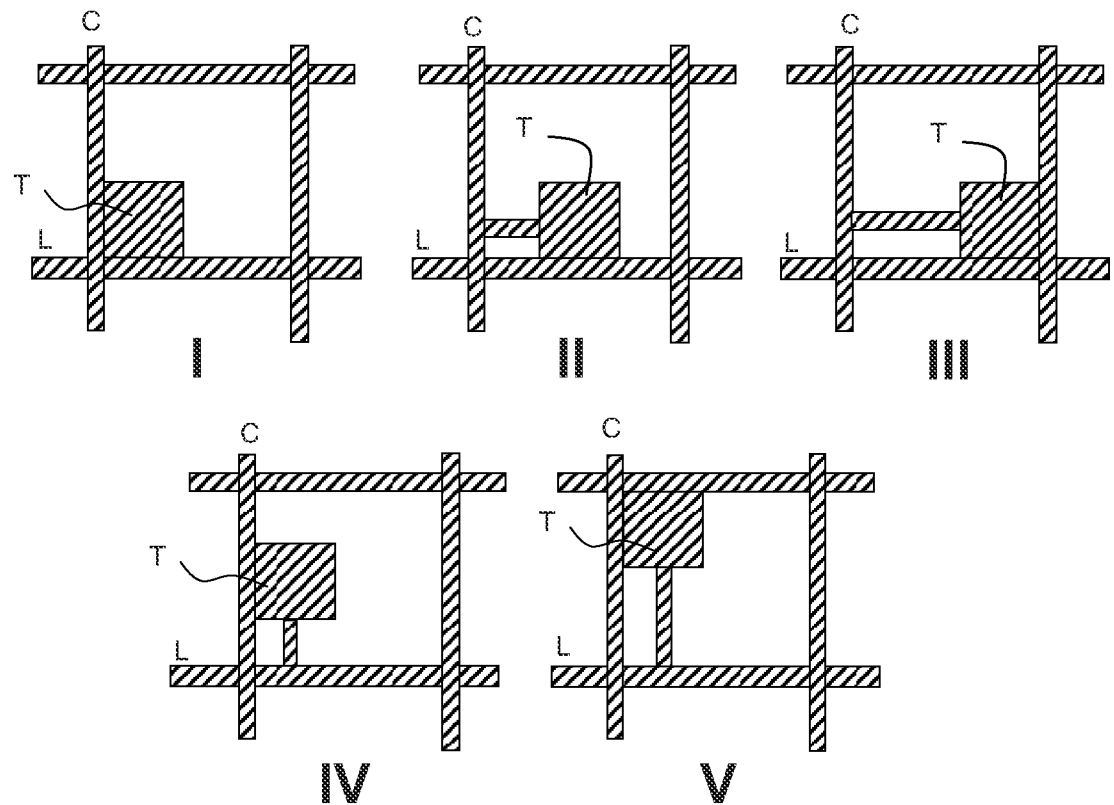
FIG. 5 shows a pixel of the matrix according to the invention, that can take five possible configurations in which the position of the transistor varies.

FIG. 5 shows five different geometrical configurations which will be distributed in a pseudo-random manner within the matrix. These configurations are denoted by the Roman numerals I to V. The assumption made in this example is that the transistor always has its gate connected to the row conductor situated underneath the transistor and its drain connected to the column conductor situated to the left of the transistor. Where the transistor is at a position where it touches the row or column conductor to which it is connected, the connection (opaque) linking the conductor and the transistor is not shown; but when the transistor is remote from the row conductor situated underneath or from the column conductor situated to the left, the connection is shown. It will be noted that this connection reduces the aperture of the pixel by a few percent.

The configurations adopted in this example are those where the opaque region representing the transistor always touches either the row conductor or the column conductor.

In the configuration I, the opaque transistor is situated at the lower left; it is adjacent to the row and to the column conductor.

In the configuration II, the transistor is situated in the lower middle; it only touches the row conductor; a link to the column conductor is provided.

In the configuration III, the transistor is situated at the lower right; the connection to the column conductor is longer than in the configuration II.

In the configuration IV, the transistor is situated in the center left; a link is established with the row conductor.

Lastly, in the configuration V, the transistor is situated at the upper left; a longer connection is established with the row conductor.

Other configurations could be envisioned, and notably a transistor situated:
 in the upper middle,
 at the upper right,
 in the center in the middle
 at the center right.

If the configurations adopted are those where the opaque region representing the transistor always touches either the row conductor or the column conductor, it could also be advantageously provided for additional connections introduced with the row or column conductors, depending on the case, to be formed either as a superposition respectively with the column or row conductors, on a metal level different from that of these conductors and electrically insulated from the latter. Thus, if the transistor has several different positions along the column, the row signal for example will transit via the row metal that will be designed as a superposition with the column conductor. The aperture of the pixel will not therefore be affected.

Configurations of this type are advantageous since they do not change the aperture of the pixel.

Figures 6, 7:
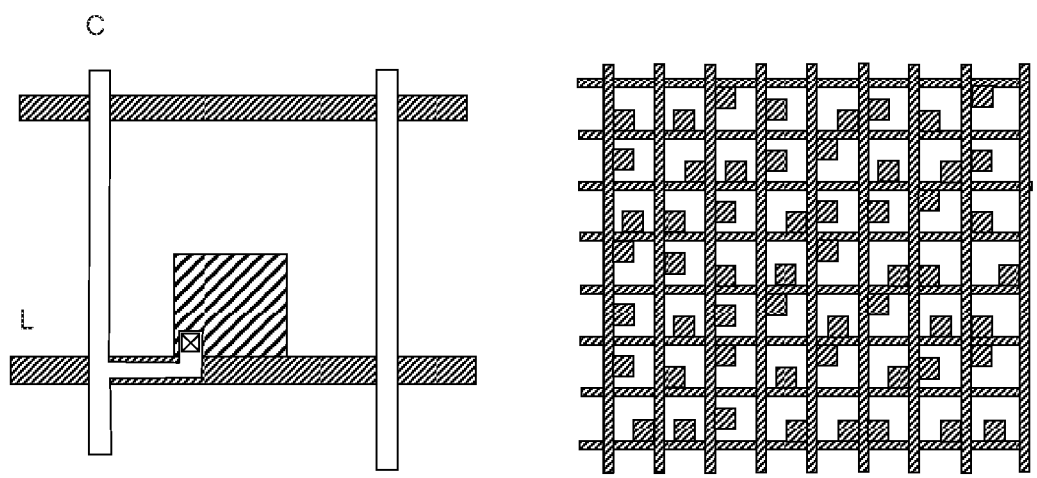
FIG. 6 shows one way of connecting the transistor to the column conductor (or the row conductor) without reducing the aperture of the pixel when the transistor is not adjacent to the column conductor (or the row conductor) to which it is to be connected.
FIG. 7 shows the matrix when the five configurations are distributed in a pseudo-random manner within the matrix.

FIG. 6 illustrates this possibility: it shows the transistor in the same fifth geometrical position as in FIG. 5-11, but the conducting link between the transistor and the row has been modified by a connection which is superposed on the parts that are already opaque and which do not therefore reduce the aperture of the pixel by an opaque region dedicated to this connection as in Figure V-II. The connection between the column and the conductor is here very simply formed by an extension of the column conductor which is superposed on the row conductor before it reaches the transistor. These connections could also be formed by a metal level different from that of the row and column conductors.

FIG. 7 shows one example of a matrix using the five configurations in FIG. 5, distributed in a pseudo-random manner both in a row and in a column. The pattern in FIG. 7 may be repeated in other portions of the matrix (in order to facilitate the design of the masks), the repetition then taking place with a repetition pitch much greater than the wavelength, preferably at least one hundred times the wavelength. In practice, the pattern of pseudo-random configurations which can be repeated comprises at least fifty pixels. The connections necessitated by the separation between the transistor and the rows are not shown in FIG. 6 so as not to overburden the figure.

In the preceding description, the opaque regions representing the transistors have been shown for the sake of simplicity as squares; they can have other shapes. Shapes having oblique inclinations with respect to the directions of the rows and columns promote the spreading of the diffraction peaks. Thus, polygonal geometries of transistors will be preferred. An octagonal geometry will give a better spreading than a hexagonal geometry, itself better than a square geometry.

The invention claimed is:

1. A liquid crystal active matrix comprising a regular array of rows and columns of pixels, each pixel being bounded by two adjacent row conductors and two adjacent column conductors, with, for each pixel, a transparent region covered by a transparent electrode and opaque regions resulting from a presence in the pixel of the row conductors, of the column conductors, and of a control transistor connected to the transparent electrode of the pixel, wherein the pixel comprises at least three different geometrical configurations, a position of the transistor with respect to the row and column conductors to which the pixel is connected being different in the at least three different geometrical configurations, the at least three different geometrical configurations being distributed in a pseudo-random manner within at least one region repeated periodically in the active matrix, the region comprising a group of at least one hundred pixels.

2. The active matrix as claimed in claim 1, wherein the matrix comprises a periodic arrangement of several regions within which a distribution of the at least three different geometrical configurations of the pixels is pseudo-random.

3. The active matrix as claimed in claim 2, wherein the pixels are distributed according to at least five possible configurations.

4. The active matrix as claimed in claim 1, wherein the pixels are distributed according to at least five possible configurations.

5. The active matrix as claimed in claim 4, wherein the transistor is connected to the row conductor positioned underneath the pixel and to the column conductor positioned left of the pixel, and wherein the pixel can take one of the following configurations: transistor at a lower left portion of the pixel, transistor in a lower middle portion of the pixel, transistor at a lower right portion of the pixel, transistor in a center left portion of the pixel, or transistor at an upper left portion of the pixel.

6. The active matrix as claimed in claim 1, wherein in at least one of the geometrical configurations, the transistor is adjacent to a row conductor or respectively a column conductor but is not adjacent to a column conductor or respectively a row conductor to which it is to be connected, and in that a connection between the transistor and this column conductor or respectively row conductor is provided by a conductor which is superposed on the row conductor or respectively column conductor.

7. The active matrix as claimed in claim 6, wherein the connection via a conductor which is superposed on the row conductor or respectively column conductor is an extension of the column conductor or respectively row conductor running on top of the row conductor or respectively column conductor.

* * * * *